United States Patent [19]
Yuda

[11] Patent Number: 5,440,971
[45] Date of Patent: Aug. 15, 1995

[54] CYLINDER WITH MOUNTING FOR GUIDE RODS

[76] Inventor: Lawrence F. Yuda, P. O. Box 499, Westminster, S.C. 29693

[21] Appl. No.: 347,837

[22] Filed: Nov. 30, 1994

Related U.S. Application Data

[63] Continuation of Ser. No. 151,059, Nov. 12, 1993, abandoned, which is a continuation of Ser. No. 964,060, Oct. 21, 1992, abandoned.

[51] Int. Cl.⁶ .............................................. F16V 15/18
[52] U.S. Cl. ................................. 92/165 PR; 403/258
[58] Field of Search ............. 92/165 R, 165 PR, 166; 403/13, 14, 256, 258, 260

[56] References Cited

U.S. PATENT DOCUMENTS

| | | | |
|---|---|---|---|
| 272,406 | 2/1883 | Blackstock | 403/258 |
| 945,413 | 1/1910 | Phelps | 92/165 R |
| 3,279,870 | 7/1963 | Janiszewski | 403/260 |
| 3,503,638 | 3/1970 | Holzel | 403/258 |
| 4,380,427 | 4/1983 | Hehl | 425/590 |
| 5,113,746 | 5/1992 | Yuda | 92/165 PR |

*Primary Examiner*—F. Daniel Lopez
*Attorney, Agent, or Firm*—Ralph Bailey

[57] ABSTRACT

A guided cylinder wherein a yoke (B) for bridging diagonally opposed guide rods (A) has connection thereto by means of first enlarged aligned abutments (C) adjacent upper ends of the guide rods to provide a mounting as well as flats for securely holding guide rods while affixing the yoke and thereafter providing a stable mounting for the yoke. The yoke has second abutments (E) integral with the first abutments for receiving threaded fasteners (D), having a lesser cross-sectional area extending upwardly into recesses therefor carried in the yoke to eliminate lateral movement as may result in misalignment of the guide rods.

2 Claims, 2 Drawing Sheets

CYLINDER WITH MOUNTING FOR GUIDE RODS

This application is a continuation of application Ser. No. 08/151,059, filed Nov. 12, 1993, abandoned, which is a continuation of application Ser. No. 07/964,060, filed Oct. 21, 1992, abandoned.

BACKGROUND OF THE INVENTION

This is an improvement upon the invention of U.S. Pat. No. 5,113,746 and relates to a guided cylinder wherein improved abutment means are provided for connecting the guide rods to the yoke.

Guide cylinders have been provided by positioning a pair of diagonally opposed guide rods upon a vertically slidable mounting in the cylinder and bridging the guide rods by means of a yoke. A piston rod is connected to the yoke between the guide rods on one end and to a piston on the other end. It is also the common practice to utilize guide rods of uniform cross section throughout their length and to provide an internal bore at an upper end to facilitate attachment of the yoke thereto. The inward movement of the piston rod and the yoke attached to the upper end thereto between the guide rods toward the cylinder is limited by means of an end cap or some other internal structure which normally does not permit the yoke to come into sufficiently close contact with the cylinder as may result in injury to a finger inadvertently placed between the yoke and the cylinder. Such cylinders are intended for use with both torsional and direct side loading.

By means of the guide rods, the turning of the piston and the rod attached thereto is avoided, and positive guidance is provided thereby averting damage to the cylinder walls and associated parts. By limiting the rotation of the piston rod, it is thus possible to limit the length of the piston (since less guidance would require greater length) to thereby aid in the provision of miniature cylinders.

Accordingly, it is an important object of the invention to provide a guide cylinder wherein a firm support is provided for attaching the guide rods to the yokes by providing abutment means affording bearing surfaces in contact with the yokes and recesses in the yokes for receiving integral abutments extending therein to avoid substantial lateral movement as may permit misalignment of the guide rods in the cylinder.

Another important object of the invention is provided by guide rods having flats positioned on upper ends thereto adjacent the yoke to provide means for gripping same when inserting and tightening the screws attaching the yoke to the guide rods.

Still another important object of the invention is to avoid the trapping of a finger between the yoke and the cylinder as may cause injury thereto.

SUMMARY OF THE INVENTION

It has been found that first enlarged aligned abutments may be integral or otherwise fixed to each of the guide rods at the upper end adjacent the yoke of a guided cylinder. An axial bore is provided in each of the abutments in alignment with the guide rods, and a suitably threaded fastener connecting the yoke to each of the guide rods is received within the axial bores within the enlarged aligned abutments. A number of spaced vertical flats are provided on each of the enlarged aligned abutments to facilitate a gripping action, as by the application of a wrench thereto, to facilitate attachment of the yoke to the guide rods, and during operation to prevent a finger from being inadvertently trapped between the yoke and the cylinder.

Second abutment means are provided integral with the first abutments extending upwardly therefrom into recesses provided in the yoke to avoid misalignment and a firm support surface on the first abutment engaging the yoke.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a pair of diagonally opposed guide rods A vertically slidable in a cylinder and bridged by a yoke B. A piston rod is connected to the yoke between the guide rods on one end and to a piston on the other end. An enlarged aligned abutment C is integrally fixed to each of the guide rods at an upper end adjacent the yoke. An axial bore is located in each of the abutments in alignment with the guide rods. A threaded fastener D received in each of the axial bores respectively connects the yoke to each of the guide rods. A fastener connects the piston rod to a medial portion of the yoke. A plurality of spaced vertical flats are carried on each of the enlarged aligned abutments. A second abutment E is fixed with each of the first abutments for receiving a threaded fastener and having a lesser cross-sectional area extending upwardly therefrom. Walls define a recess having a complementary configuration for receiving said second abutments avoiding substantial lateral movement as may result in misalignment of the guide rods. The guide rods may be held by the flats to facilitate connecting the yoke to the guide rods. The piston rod is protected against turning, and a finger trap is avoided while providing a stable mounting for the yoke. An end cap limits the inward movement of the piston inside the cylinder to further avoid a finger trap between the yoke and the cylinder.

Figure 1:
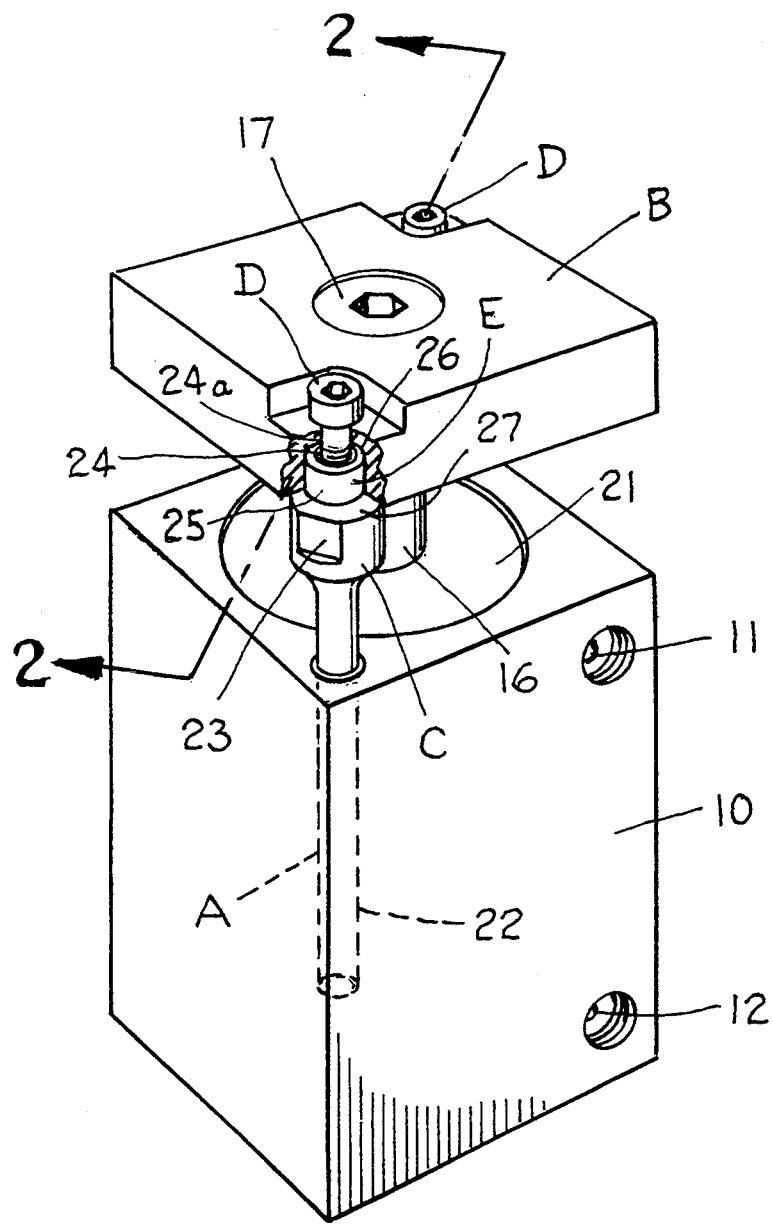
FIG. 1 is a perspective view illustrating a guided cylinder having enlarged abutments on the top of the guide rods extending into the yoke.
Figure 2:
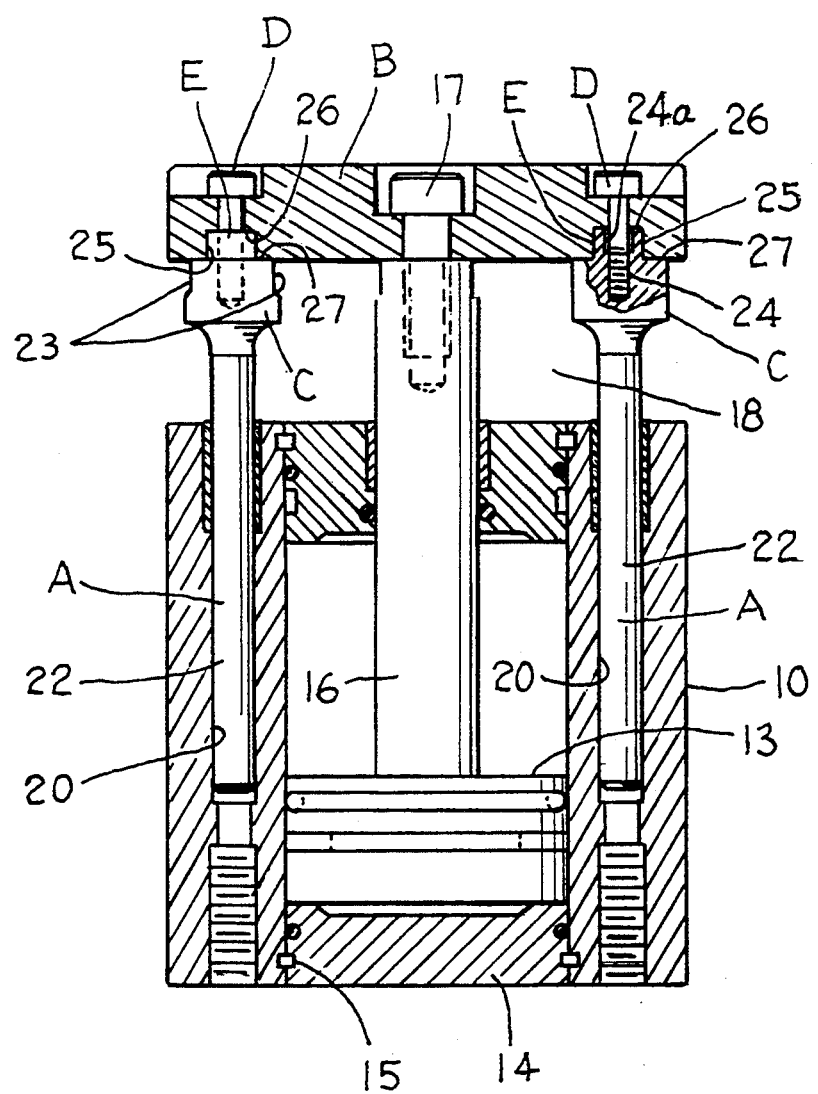
FIG. 2 is a transverse sectional elevation taken across the diagonally opposed guide rods illustrating the internal mechanism of the guided cylinder.

The drawings further show a cylinder 10, which in this instance has flat sides but which may be cylindrical, provided with ports 11 and 12 to admit fluid on each side of they cylinder (FIG. 2). The downward or internal motion of the piston 13 is limited by means of the end cap 14 suitably secured within the piston as by means of a metallic ring 15. The piston 13 has a piston rod 16 fixedly secured thereto and the piston rod extends upwardly for connection at its upper end to a yoke B. The yoke B is connected at the medial portion by a threaded screw 17 which extends vertically downwardly into a threaded bore within the upper end of the piston rod 16. It will be observed that a space 18 is defined between the yoke B and the end of the cylinder 10 by means of the end cap 14 which limits downward movement of the piston 13.

Referring again to the drawings, a pair of guide rods A are diagonally disposed in opposed relation to each other and are slidably mounted within suitable aligned vertical bores 20 provided at opposed corners of the cylinder 10. Downward movement of the yoke may also be limited as by a bottoming of the guide rods within the bores 20.

The cylinder has an end cap 21 carried at an upper end through which passes the piston rod 16. Further guidance for the piston rod 16 is provided by means of the vertically slidable rods A.

The rods A may be suitably selected from hexagonally shaped stock, or other suitable arrangement of flats, and are machined in order to provide vertically disposed reduced slidable portions 22. At the upper end of the guide rods enlarged aligned abutments C are integrally affixed. This may be accomplished by machining so as to reduce the lower ends of the guide rods A providing the slidable lower portions 22. The abutments C have a plurality of spaced flats 23 carried thereby in order to provide a gripping portion as may be engaged by a wrench when attaching the guide rods A to the yoke B at opposed corners. The abutments each have axial bores illustrated at 24 which are internally threaded to receive the threaded fastener screws D within the bores.

The second abutment E is cylindrical and integral with the first abutment C. It will be noted that the first abutment C is enlarged and that the upwardly extending abutment E has a lesser diameter than the first abutment C. The abutment E has a cylindrical bore 24a for receiving the shank of the threaded fastening member D carrying the externally threaded portion. The cylindrical walls 25 and flat upper wall 26 define a recess having a complementary configuration for receiving the second abutments E avoiding substantial lateral movement as may result in misalignment of the guide rods. The upper surface 27 of the first abutment C bears against a lower surface of the yoke so as to provide a substantial bearing relationship therefor.

Accordingly, an improved guided rod cylinder has been provided wherein enlarged first abutments are carried at an upper end of the opposed guide rods carried for vertically slidable movement within the cylinder to afford guidance to the piston rod. As an additional feature, finger entrapment is further avoided by the limiting of movement which would be afforded but for the enlarged abutment in respect to the reduced size of the bores 20. Additional stability and strength is provided for the yoke which bridges guide rods to afford stable connection for the upper end of the piston rod. The second abutments are provided to prevent lateral movement of the rods as may result in misalignment and to provide a firm support for the yoke.

While a preferred embodiment of the invention has been described used specific terms, such description is for illustrative purposes only, and it is to be understood that changes and variations may be made without departing from the spirit or scope of the following claims.

What is claimed is:

1. A cylinder having a pair of opposed guide rods vertically slidable therein and bridged by a yoke, and a piston rod connected to said yoke between said guide rods on one end and fixedly secured to a piston on the other end comprising:

a first enlarged elongated aligned abutment integral with each of said guide rods at an upper end adjacent said yoke;

a second abutment integral with each of said first abutments having axially aligned sides extending upwardly therefrom, said second abutment having a lesser cross-sectional area than said first abutment;

a lower axial bore extending from an upper surface of said second abutment through each of said first abutments and terminating within a threaded portion thereof;

an upper axial bore extending from an upper surface of said yoke and adjoining each of said lower axial bores in alignment therewith;

a fastener having a shank received in each of said lower and upper axial bores respectively and a head bearing against said upper surface of said yoke connecting said yoke to each of said guide rods;

said shanks having a threaded lower end portion in threadable engagement with said threaded portions in each of said first abutments;

axially aligned walls in said yokes terminating in a horizontal end wall defining a recess having a complementary configuration for receiving and engaging said axially aligned sides of each of said second abutments avoiding substantial lateral movement as may result in misalignment of the guide rods;

said recess extending from said underside of said yoke terminating therein; and spaced upper horizontal bearing surfaces provided by each of said first and second abutments for engagement with said underside of said yoke and with said horizontal end wall of said recess in said yoke, respectively, for providing increased load bearing capability between said guide rods and said yoke;

whereby a firm support is provided for attaching said guide rods to said yoke in axial alignment thereon.

2. The structure set forth in claim 1 wherein said second abutments are cylindrical.

* * * * *